United States Patent [19]

Jaulmes

[11] 4,065,945
[45] Jan. 3, 1978

[54] ANTI-THEFT DEVICE FOR HELMET AND HELMET FOR USE WITH THE DEVICE

[75] Inventor: Eric Jaulmes, Paris, France

[73] Assignee: Ateliers de la Motobecane, Pantin, France

[21] Appl. No.: 710,477

[22] Filed: Aug. 2, 1976

[30] Foreign Application Priority Data

Aug. 5, 1975 France ................................ 75.24532
June 29, 1976 France ................................ 76.19716

[51] Int. Cl.$^2$ ............................................. E05B 73/00
[52] U.S. Cl. ......................................................... 70/58
[58] Field of Search .................... 70/58, 59, 183, 186, 70/225, 226, 233

[56] References Cited

U.S. PATENT DOCUMENTS

| 3,646,786 | 3/1972 | Baker | 70/59 |
| 3,779,597 | 12/1973 | Uchida | 70/58 X |
| 3,805,565 | 4/1974 | McLarnon | 70/59 |
| 3,823,856 | 7/1974 | Uchida | 70/58 X |

Primary Examiner—Richard E. Moore
Attorney, Agent, or Firm—Browdy and Neimark

[57] ABSTRACT

An anti-theft device for helmets particularly adapted to be used on vehicles with a locking front fork for preventing the vehicle from being stolen. The device contains securing means for securing the helmet to the vehicle and a locking means for locking the securing means by placing the fork of the vehicle in its locked position. The helmet is secured in a position which protects its interior from exposure to the weather.

9 Claims, 10 Drawing Figures

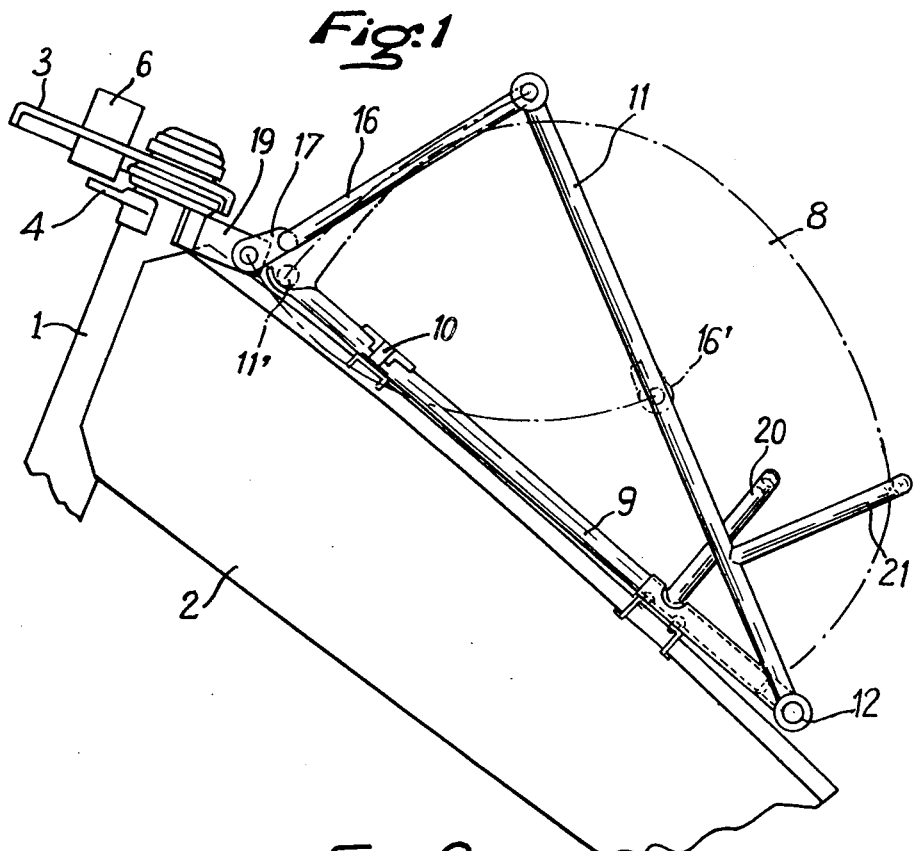
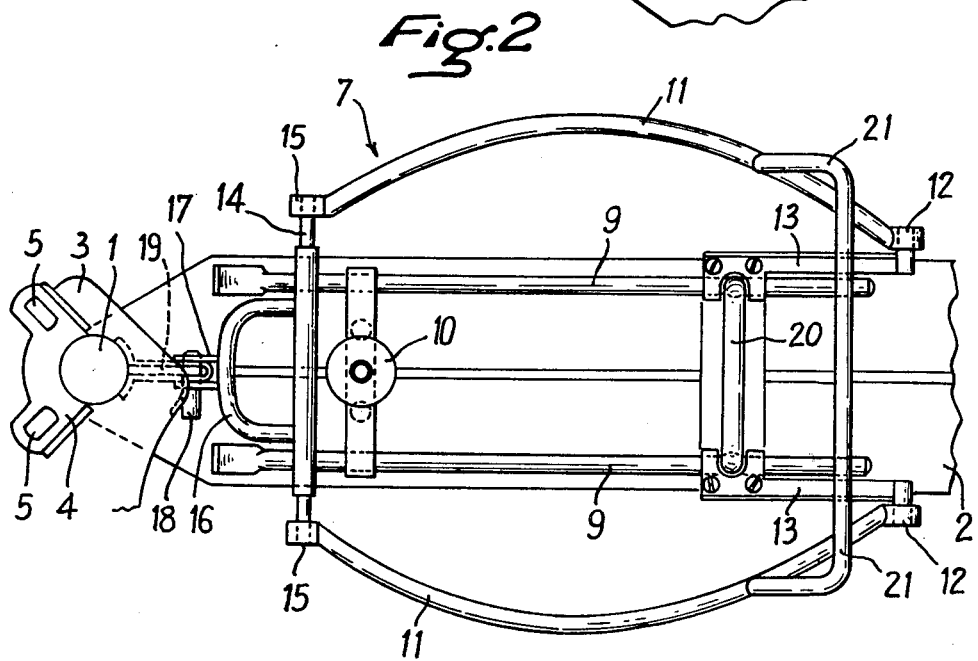

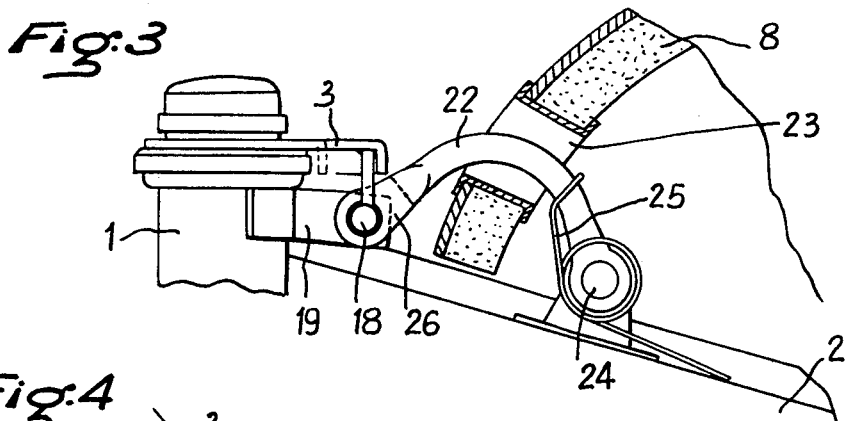
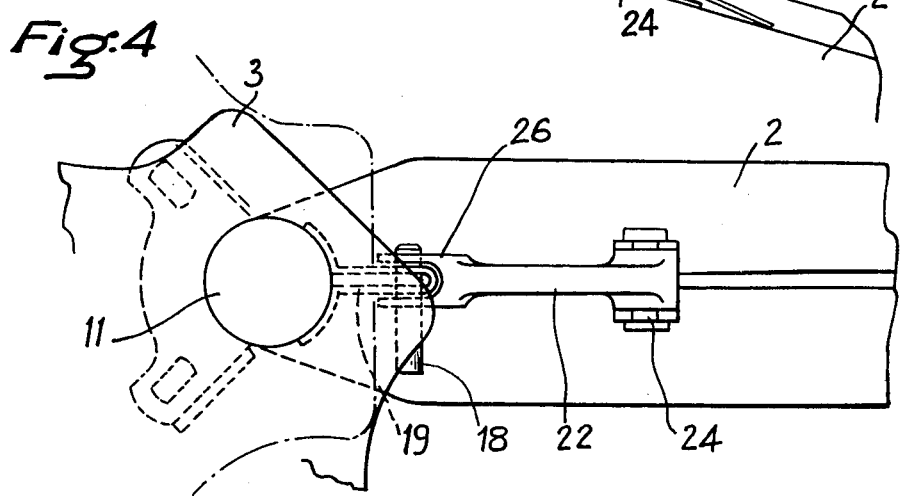
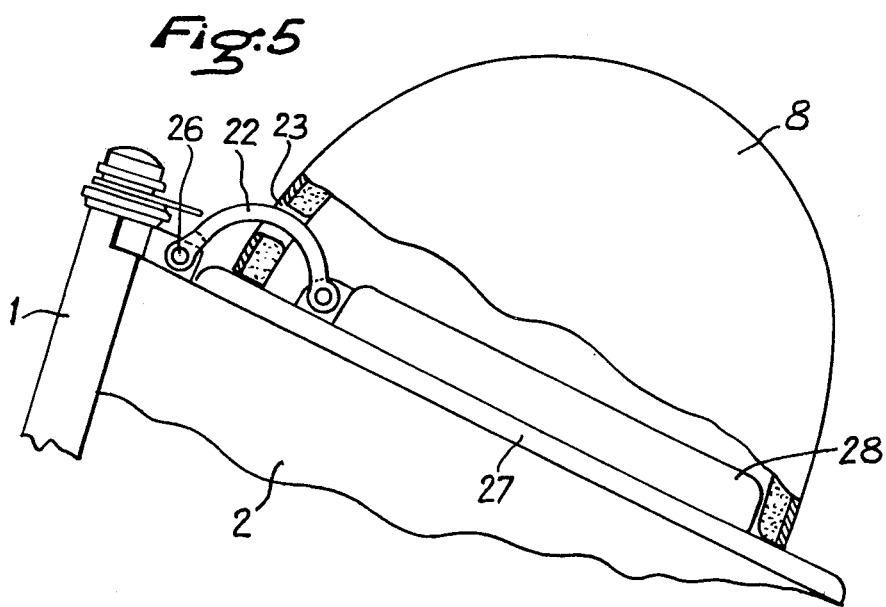

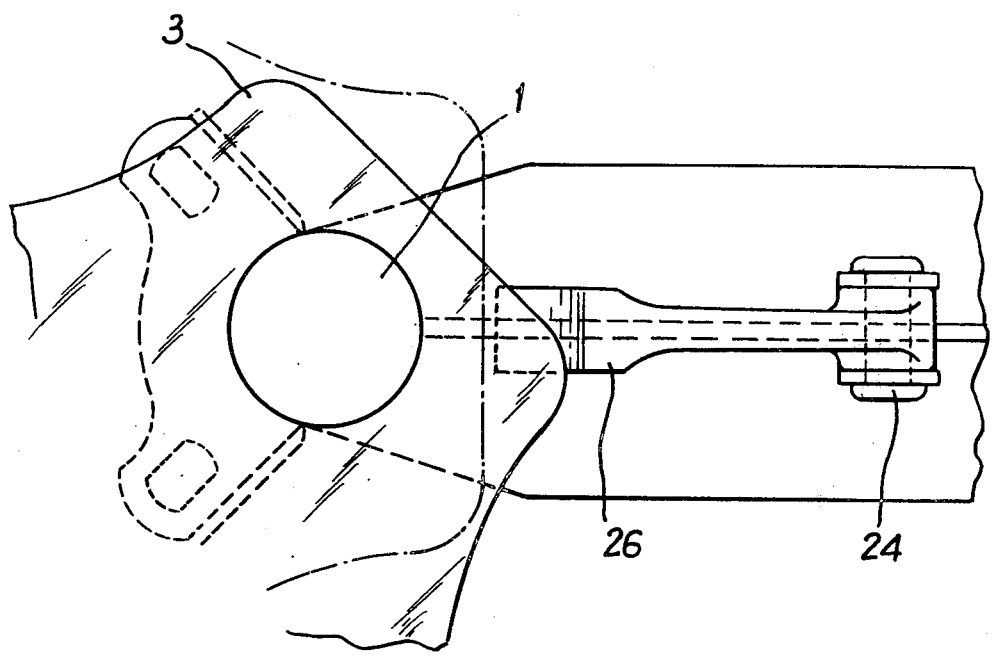

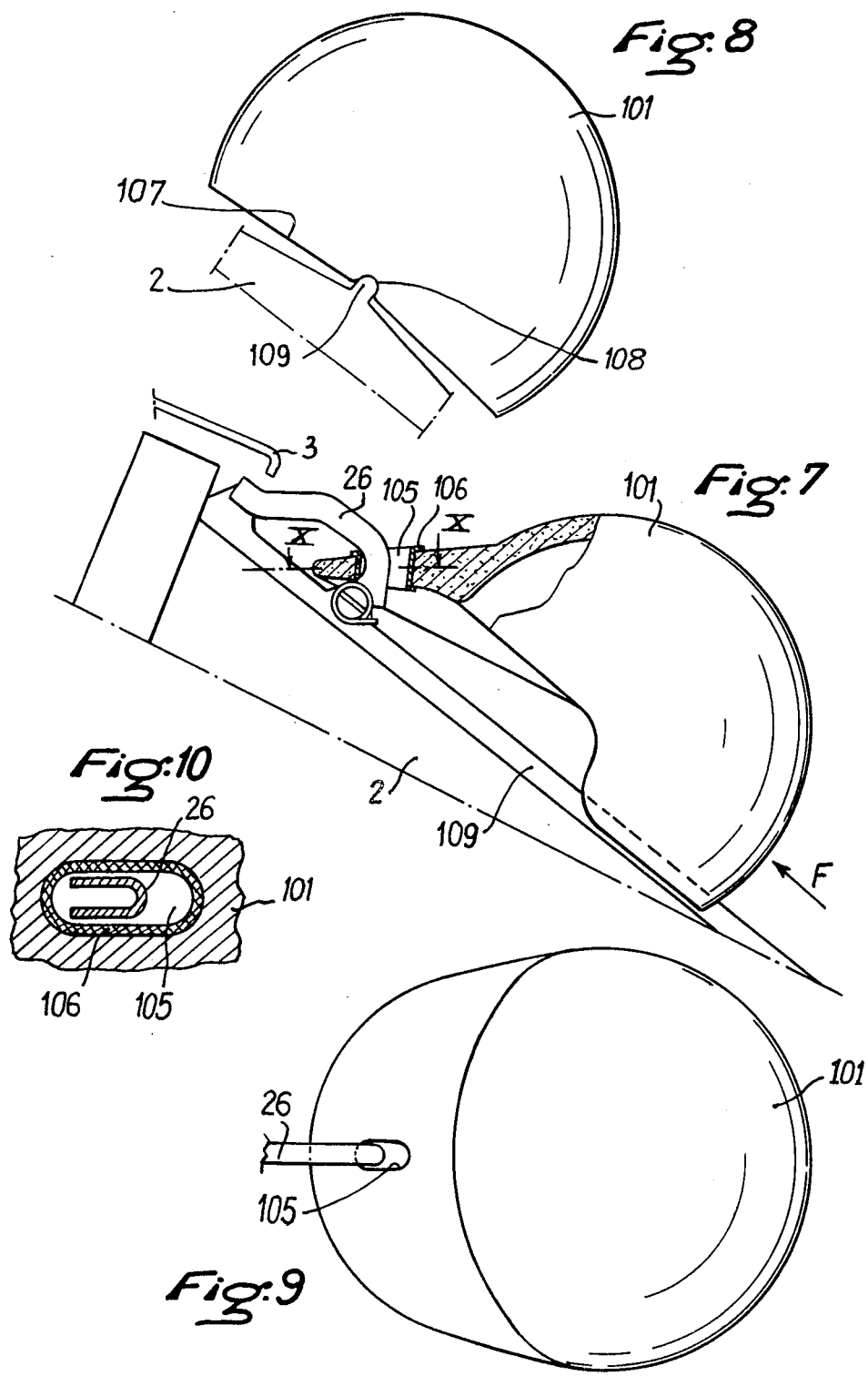

ANTI-THEFT DEVICE FOR HELMET AND HELMET FOR USE WITH THE DEVICE

FIELD OF THE INVENTION

The present invention relates to an anti-theft device for a helmet, applicable in particular to vehicles in which the fork can be locked in a certain position.

BACKGROUND OF THE INVENTION

It is known that vehicle users, particularly of two-wheeled vehicles, wish to be able to leave their helmets without risk of such helmuts being stolen when they park their vehicles.

Helmet anti-theft devices made of a metal cage that remains on the vehicle are known for this purpose. This cage can be secured by a lock and key. However, such a device has the disadvantage of taking up a great deal of space.

Other devices comprise a hook, attached for example to the handlebars, which can pass through an opening in the helmet and then be locked.

These various device require the use of a special key and in addition leave the helmet exposed to the weather.

SUMMARY OF THE INVENTION

An object of the present invention is to remedy these disadvantages. For this purpose the anti-theft helmet device to which it relates, usable on a vehicle whose front fork can be locked at a certain angle to the frame of the vehicle to prevent theft of the latter, includes in combination securing means for holding the helmet and locking means controlled by the position of the fork, able to prevent removal of the helmet from the securing means when the fork is in the locking position.

Thus, with the aid of a single key, one can immobilize the vehicle and lock the helmet. In fact, the front fork, immobilized in its locking position by any known means, in turn locks the helmet-holding means without the requirement of a second lock.

Advantageously, the securing means are articulated on the frame of the vehicle and include an element suitable for cooperating with a pin integral with the front fork.

This pin pivots with respect to the vehicle frame and locks the helmet-holding means when the fork is in its locking position, generally at one of the ends of its angular course of travel.

According to a preferred embodiment of the invention, such element is composed of a clevis able to cover a holding strip integral with the frame of the vehicle when the securing means are in the helmet-holding position, the clevis and holding strip having apertures with substantially the same axis when the securing means are in this position, and a pin penetrating these apertures when the front fork is in its locking position.

The means for holding the helmet preferably include a hook articulated on the frame, this hook being able to pass through an opening provided in the helmet.

The invention also relates to a helmet able to be used in combination with the latter embodiment of the device. It has, in fact, been found that an opening provided in the part of the helmet covering the head weakens the helmet and thus impairs its effectiveness in an accident. In addition, it permits the entry of insects, with the resultant hazards for the vehicle user.

The invention enables this disadvantage to be remedied and for this purpose provides a helmet which has an opening provided in its visor. In fact, it is unnecessary for the helmet visor to be very strong and there is thus no difficulty in decreasing this strength by providing an opening therein.

In a preferred embodiment of the above helmet, the opening is oblong in shape and able to cooperate with a hook having an oblong cross section as well, to prevent the helmet from rotating.

The helmet can, for example, be immobilized longitudinally with respect to the frame of the vehicle and be placed on a tube of this frame. The shape of the opening and that of the hook prevent the helmet from pivoting about this hook and on the contrary ensure that it continues to bear on this tube.

The helmet preferably has, at the rear center of its rim, a notch able to cooperate with a rib provided on its bearing surface on the vehicle. In fact, this rib already exists on certain motorcycles with the tanks formed of two stampings.

This arrangement enables the helmet to be prevented from rotating even more reliably.

BRIEF DESCRIPTION OF THE DRAWINGS

The invention will be better understood with the aid of the description hereinbelow of two embodiments of the invention. In the scchematic diagrams attached:

FIG. 1 is a side elevational view of the device according to the invention in the unlocked position;

FIG. 2 is a top plan view in the locked position;

FIG. 3 is a partial side elevational view of an alternative embodiment;

FIG. 4 is a top plan view thereof;

FIG. 5 is an overall elevational view of this embodiment;

FIG. 6 shows a top plan view of another embodiment of this alternative;

FIG. 7 is a side elevational view partly in section of a helmet according to the invention;

FIG. 8 is an elevational view taken along arrow F in FIG. 7;

FIG. 9 is a partial top plan view of the invention; and

FIG. 10 is a cross sectional view along line 10—10 of FIG. 7.

DESCRIPTION OF PREFERRED EMBODIMENTS

FIGS. 1 and 2 show part of the motorcycle including steering tube 1 on which the front fork and fuel tank 2 are mounted, both integral with the machine's frame.

A fork plate 3 is mounted integrally with the fork, while another plate 4 which forms a fork stop provided with holes 5 is attached to steering tube 1. A locking pin 6 is mounted on fork plate 3 such that, when the fork is steered in one or another direction, an arm coming out of this lock can penetrate one of holes 5, thus preventing the fork from rotating.

The device, according to the invention, includes a set of tubes 7 able to hold a helmet 8. This set first has two fixed tubes 9, fixed to the frame by means of a holding strip 10, and on which the helmet is placed. Two other curved tubes 11 imprison the helmet. These tubes are articulated at one end by means of threads 12 onto holding strip 13 attached to tubes 9.

The other ends of tubes 11 are connected by an element 14 also provided with threads 15, which threads are oriented in opposite directions. Rotation of element 14 thus causes an adjustment of the spacing of these ends of tubes 11.

Another tube 16, U-shaped, is integral with element 14 and has a clevis 17.

The device also has a pin 18 integral with fork plate 3 and a holding strip 19 integral with steering tube 1, and thus with the frame of the vehicle.

In the position wherein the helmet is imprisoned, clevis 17 embraces holding strip 19. These two elements have holes which, in this position, are coaxial. When the fork is turned, as shown in FIG. 2, fork plate 3 pivots, and pin 18 penetrates into the holes in clevis 17 and in holding strip 19, thus locking tubes 16, and hence the whole device. Fork plate 3 is then locked into this position with the aid of locking pin 6.

When the device is not in use, namely while the vehicle is moving, tube 16 is pushed back around the axis of threads 15, coming into position 16', then tubes 11 are pushed back around the axis of threads 12 and come to position 11'. This set of tubes then forms, with tubes 9, a grid which can be used to carry luggage. Tubes 9 and 11 advantageously have arches 20 and 21 enabling parcels placed on this grid to be held toward the back.

In an alternative embodiment shown in FIG. 3, the means for gripping the helmet comprises only a hook 22. Helmet 8 has an opening 23 through which the hook 22 passes. The latter is articulated about an axis 24, integral with the vehicle frame, and is brought into the locking position by a spring 25.

Locking of the hook is accomplished, like that of tube 22 in the preceding embodiment, by means of pin 18, which is integral with fork plate 3 and clevis 26.

Advantageously, the helmet is placed on a platform 27 integral with the frame which has a projection 28 adapted to the shape of the helmet to prevent the latter from being turned around and exposed to the weather.

Helmet opening 23 will advantageously be standardized in diameter and position so that the above device can be used with all types of helmets.

In the embodiment shown in FIG. 6, pin 18 and holding strip 19 are eliminated. It is then fork plate 3 which prevents the hook from opening when the front fork is turned to one side. On the other hand, when this fork is aligned with the machine, the hook can rise, freeing the helmet.

FIG. 7 represents in particular a device such as that shown in FIG. 6. A helmet 101 is placed on fuel tank 2 of a motorcycle onto which a hook 26 is articulated. This hook is locked by a fork plate 3 integral with the front fork when this front fork is in its locking position.

Helmet 101 can be of the thick-visor or thin-visor type. It will, however, preferably be of the thick-visor type to prevent it from tilting.

According to the invention, an opening 105 is provided in the helmet visor, this preferably being oblong in shape as shown more particularly in FIGS. 9 and 10. This opening can be bordered by an eyelet 106. Hook 26, which can be of U-shaped stamped metal, also has a cross section of oblong shape such that when it is engaged in opening 105 it prevents the helmet from rotating. To do this, it is sufficient for the smallest dimension of its cross section to be only a little less than the transverse dimension of opening 105.

As shown in FIG. 8 this rotational locking is even better ensured by the helmet being supplied at the rear center of its rim 107 with a notch 108 which can engage a rib 109 provided at the upper part of fuel tank 2.

It should be noted that the present invention is not confined to the embodiments described hereinabove but on the contrary embraces all embodiment variations.

What is claimed is:

1. An anti-theft device for a helmet for use on a vehicle having a front fork, a frame and locking means for the front fork, the front fork being locked by the locking means whenever the front fork is positioned at a given angle with respect to the frame of the vehicle in order to prevent the vehicle from being stolen, the device comprising, in combination: helmet-securing means for removably holding a helmet to the vehicle; and additional locking means coupled to said fork and controlled by the position of said fork and cooperating with said helmet securing means for preventing removal of a helmet from said securing means whenever the fork is positioned at said given angle in its locked position.

2. A device according to claim 1, wherein said helmet-securing means includes an element articulated to said frame of the vehicle and said additional locking means comprises a pin integral with said front fork.

3. A device according to claim 2, wherein said element is composed of at least one clevis and said additional locking means includes a holding strip integral with said frame of the vehicle, said clevis and said holding strip having holes with substantially the same axis when said helmet securing means are in locked position at which position said pin penetrates said holes when said front fork is in its locking position.

4. A device according to claim 3, wherein said helmet-securing means comprises a set of articulated tubes which are to surround a helmet when said locking means and said additional locking means are in their locking positions.

5. A device according to claim 4, wherein said clevis is disposed on one of said articulated tubes.

6. A device according to claim 3, wherein said helmet-securing means comprises a hook articulated on said frame, said hook being adapted to pass through an opening provided in a helmet which is to be secured.

7. A device according to claim 6, wherein said clevis is disposed at a free end of said hook.

8. A device according to claim 1, wherein said helmet-securing means comprises a hook articulated on said frame of the vehicle, said hook being adapted to pass through an opening provided in a helmet which is to be secured, and a plate integral with said front fork, said plate having an extension which cooperates with a free end of said hook to prevent said hook from opening when said front fork is in its locking position.

9. A device according to claim 6, further comprising a plate on which a helmet which is to be secured can be placed.

* * * * *